Figure 1:
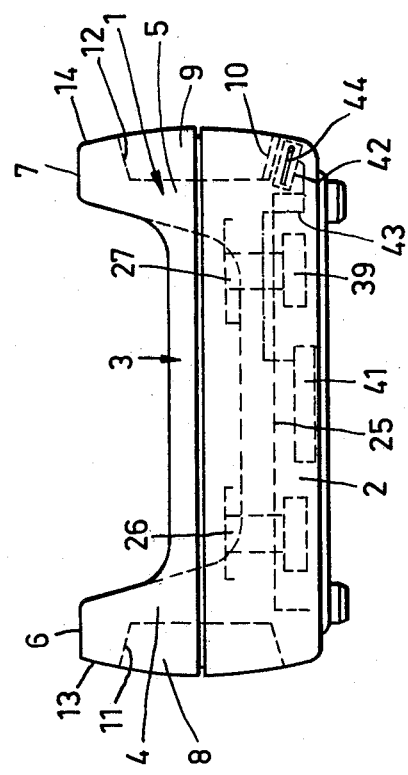

United States Patent [19]

Vogel et al.

[11] 4,339,012
[45] Jul. 13, 1982

[54] BABY SCALE

[75] Inventors: Sönke Vogel, Hamburg; Frohmut Müller, Barsbüttel, both of Fed. Rep. of Germany

[73] Assignee: Vogel & Halke, Hamburg, Fed. Rep. of Germany

[21] Appl. No.: 223,419

[22] Filed: Jan. 8, 1981

[30] Foreign Application Priority Data

Jan. 21, 1980 [DE] Fed. Rep. of Germany ... 8001469[U]

[51] Int. Cl.³ .......................................... G01G 21/22
[52] U.S. Cl. ...................................... 177/262; D10/91
[58] Field of Search .......................... 177/262; D10/91

[56] References Cited

U.S. PATENT DOCUMENTS

| D. 192,649 | 4/1962 | Vogel | D10/91 |
|---|---|---|---|
| D. 205,160 | 6/1966 | Reinecke et al. | D10/91 X |
| 1,275,911 | 8/1918 | Hansen | 177/262 |
| 3,279,549 | 10/1966 | Feinberg et al. | 177/262 X |

FOREIGN PATENT DOCUMENTS 649896 10/1962 Canada ................................. 177/262

Primary Examiner—George H. Miller, Jr.
Attorney, Agent, or Firm—Toren, McGeady & Stanger

[57] ABSTRACT

A housing is mounted on a base and formed with an open-topped depression adapted to receive a baby to be weighed. Weighing means and weight-indicating means are provided, which are responsive to a weight applied to said housing. The housing has two side walls, which define said depression on opposite sides thereof and each of which has at its top a continuous grip flange and is formed under said grip flange with an opening which together with said grip flange constitutes a carrying handle and is defined by a sparlike grip portion formed by said grip flange.

10 Claims, 5 Drawing Figures

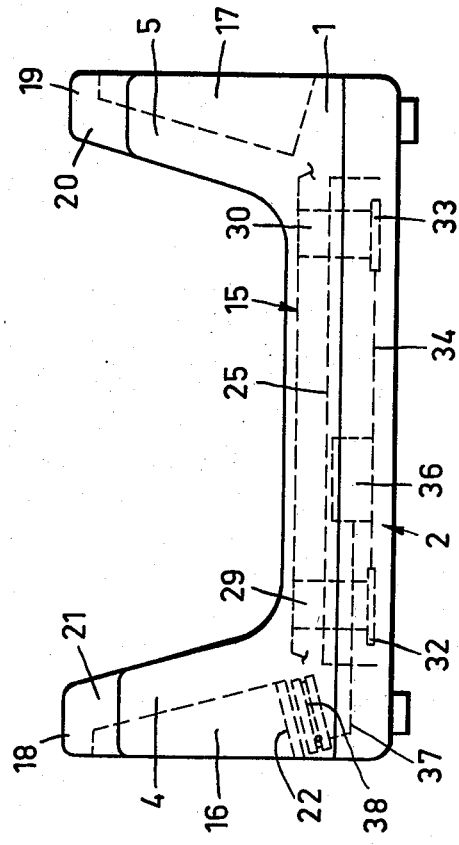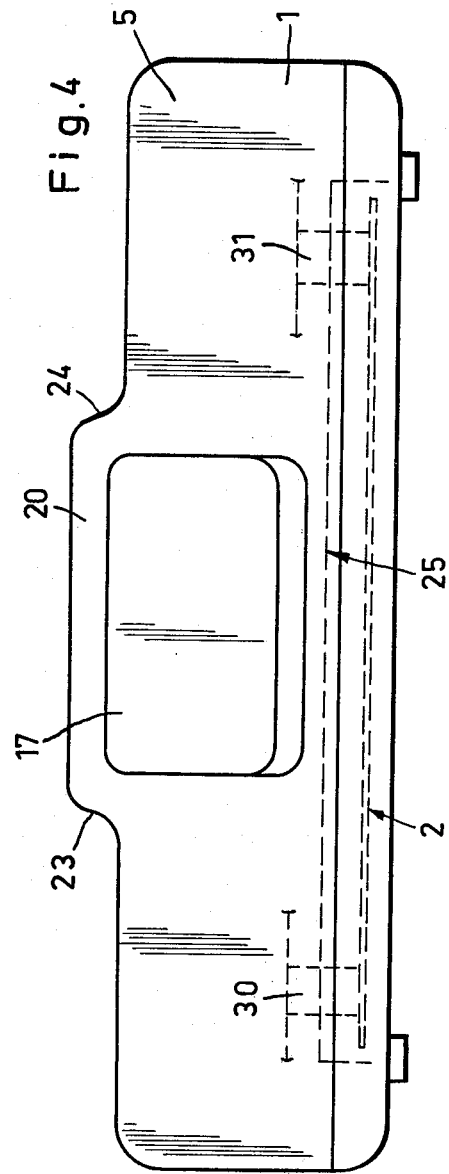

BABY SCALE

This invention relates to a baby scale comprising a scale housing which has upright side walls defining a trough. In such baby scales in which the housing constitutes also the table of the scale formed at the top with a trough, problems arise which relate to the transportation of the scale and the quiet position of the baby, who tries to find a hold.

It is an object of the invention so to design the above-mentioned baby scale that it can be transported without the need for a hand reaching under the scale housing and that the baby can find a better hold.

In accordance with the invention this object is accomplished in that each side wall has at its top a continuous grip flange and under the grip flange is formed with an opening, which together with the grip flange constitutes a carrying handle and is defined by a sparlike handle portions formed by the grip flange. The small hands of the baby can embrace to a certain extent the sparlike handle portions so that he or she is steadied in his or her lying or seated position. Besides, the openings on both sides can receive both hands of a person carrying the scale.

The length of each opening is suitably about ⅓ of the length of the depression. With that length of each opening, a seated or lying baby can grip the sparlike handle portions. Because the opening is arranged in the middle, the baby will find a hold in the middle portion of the trough.

In a preferred embodiment the side walls defining the trough have preferably in the middle portion of their length an upward extension formed with an opening. This will facilitate the gripping. In particular, the baby is induced to find a hold in the middle portion of the trough.

The openings may extend through the side walls or the upward extensions thereof. In particularly preferred embodiments, the openings consist of embossed recesses formed in the walls or upward extensions near the top edge thereof. In that case the walls or extensions will remain unapertured to that the cleaning of the scale will be facilitated.

In preferred embodiments the openings have edge portions beside the top and vertical portions of the upward extensions. As a result, the vertical portions of the upward extensions constitute sparlike handle portions to be embraced by the baby, particularly when he or she is lying.

The openings consist suitably of outwardly open recesses, which are formed in the walls or upward extensions and extend over a substantial part of the height of the side walls. In that case the trough has a smooth wall portion that is free from openings so that cleaning will be further facilitated and the sparlike handle portions can be particularly conveniently embraced by the fingers of the baby from the outside. The height of the recesses may exceed the depth of the bowl; this will facilitate the use of the recess as carrying handles. The top edge of the recesses is suitably spaced from the top of a grip flange formed by a wall or upward extension by a distance which is substantially as large as the width of the top edge of the wall or upward extension. This will result in an ergonomically desirable design.

Figure 2:
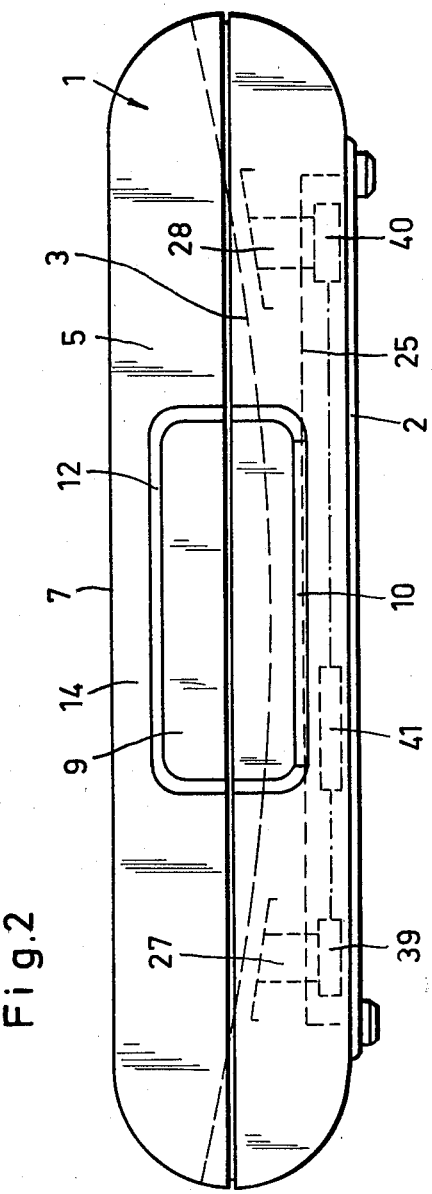
Figure 5:
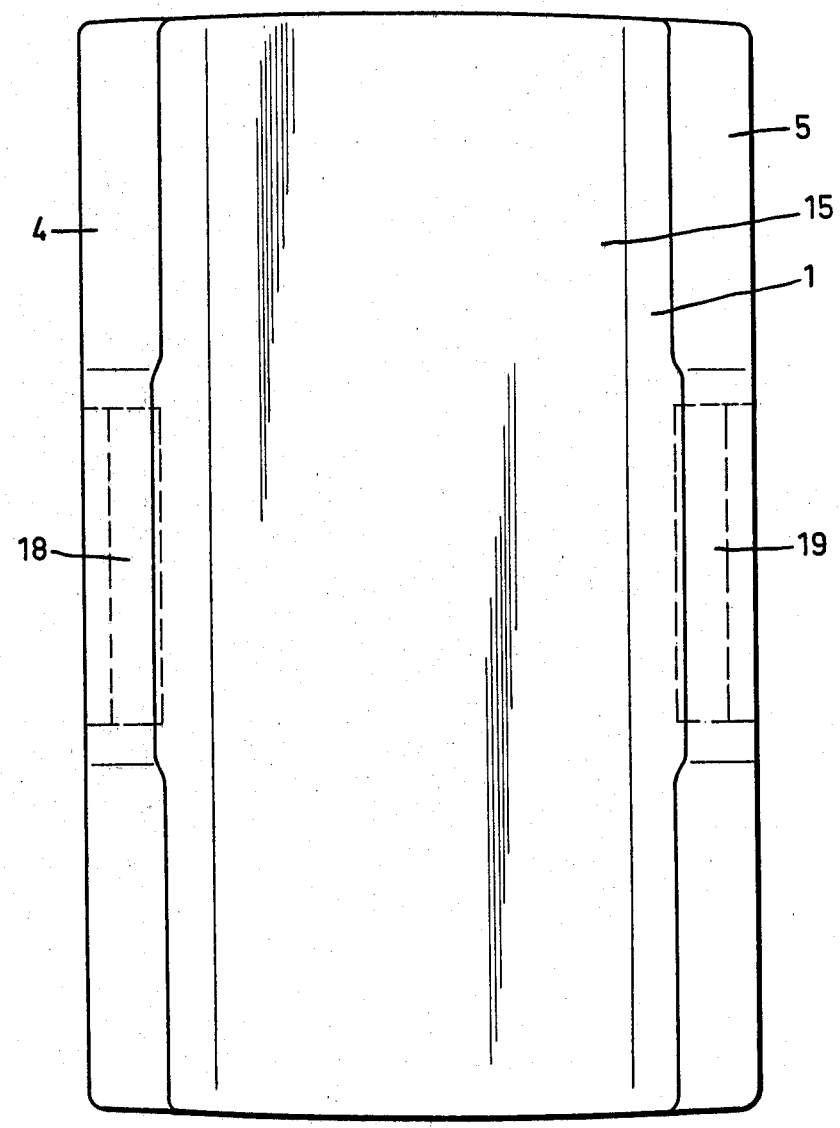

The invention will be explained hereinafter with reference to two desirable embodiments shown by way of example on the drawings, in which FIG. 1 is an end view showing a baby scale, FIG. 2 is a side elevation showing the scale of FIG. 1, FIG. 3 is an end view showing another embodiment of a baby scale, FIG. 4 is a side elevation showing the scale of FIG. 3, and FIG. 5 is a top plan view showing the scale of FIG. 3.

The housing of the baby scale shown in FIG. 1 and 2 constitute also the vertically movable table of the scale and extends close to the surface on which a base 2 of the scale is supported. The housing is formed with a bowl 3, which is defined by side walls 4, 5, which at their top constitute continuous grip flanges 7, 6, on which the baby can support him- or herself.

Each side wall 4 or 5 is formed on the outside with an outwardly open opening or recess 8 or 9 having a height that is more than one-half of the height of the wall 4 or 5. One of the recesses is provided in its lower portion with the indicating field 10. The top edge 11 or 12 of each recess is close to the top of the grip flange 6, 7 of the respective wall 4 or 5 so that there is a sparlike handle portion 13 or 14 near each recess.

It is apparent from FIG. 2 that each opening 8 or 9 extends over about ⅓ of the length of the housing in the middle portion of that length.

The same reference characters are used for the housing and the walls in FIGS. 1, 2 and 3 to 5.

The trough 15 shown in FIGS. 3 to 5 differs from the trough 3 of FIGS. 1 and 2 by having a flat bottom extending throughout the length of the housing. This feature can be adopted particularly if the walls 4, 5 are provided on the outside with openings, 16, 17, which are defined by sparlike handle portions 18, 19 in the middle region. In the embodiment shown in FIGS. 3 to 5, these sparlike handle portions are particularly pronounced because each wall 4, 5 has in the middle portions of its length an upward extension 20 or 21 so that the top flanges have an upward extension too, which induces the baby to find a hold thereon. The depth of the recesses 16, 17 increases downwardly so that they can be gripped conveniently when the scale is to be moved to a different position or to be transported.

An indicating field is shown by way of example at 22.

The longitudinal direction of each opening 16 or 17 is parallel to the longitudinal direction of the scale so that there are sparlike handle portions also at the substantially vertical portions 23, 24 of the upward extensions 20, 21.

The base 2 which carries the trough 3 or 15 so that it can move in response to the weight applied thereto contains a weighing system of known type, which is diagrammatically indicated at 25. Uprights 26, 27, 28, 29, 30, 31 rise from that weighing system and carry the trough 3 or 15. The uprights are carried by the weighing system and are vertically movable. If the weighing system consists of a spring scale mechanism, the uprights may be supported by leaf springs 32, 33, which are diagrammatically indicated in FIG. 3 and at one end are clamped in a fixed position relative to the base 2 and the other end support the uprights 29 to 31. The deflectable ends of the leaf springs are connected by a linkage 34, which engages an indicating device 36 of the weighing system 25. The indicating device is connected by a transfer link 37 to a pointer 38, which is movable under the indicating field 22, which is provided with a scale.

In accordance with FIGS. 1 and 2, the weighing system 25 may have force pickups 39, 40, to which load is applied by the uprights 26 to 28; this will result in a voltage change in a known measuring system 41, which belongs to the weighing system 25. A pointer mechanism 42 is disposed under the indicating field 10 and is controlled by the measuring system 41 via a functional link 43 to move a pointer 44 under a scale provided on the indicating field 10.

Such weighing system and indicating systems are known.

What is claimed is:

1. In a baby scale comprising a base, a housing
   which is mounted on said base and formed with an open-topped depression adapted to receive a baby to be weighed, and weighing means responsive to a weight applied to said housing,
   the improvement residing in that said housing has two side walls, which define said depression on opposite sides thereof and each of which has at its top a continuous grip flange and is formed under said grip flange with an opening which together with said grip flange constitutes a carrying handle and is defined by a sparlike grip portion formed by said grip flange.

2. The improvement set forth in claim 1, wherein said depression consists of a trough.

3. The improvement set forth in claim 1, wherein each of said openings has a length of about ⅓ of the length of said depression.

4. The improvement set forth in claim 1, wherein said opening in each of said side walls consists of an embossed recess near the top of the side wall.

5. The improvement set forth in claim 1, wherein each of said openings consists of an outwardly open recess and extends over a major part of the height of the respective side wall.

6. The improvement set forth in claim 1, wherein each of said side walls has an upward extension formed with at least part of said opening formed in said side wall.

7. The improvement set forth in claim 6, wherein said upward extension of each of said side walls is disposed in a middle portion of the length of said side wall.

8. The improvement set forth in claim 6, wherein said opening in each of said side walls consists of an embossed recess, which extends at least in part in said upward extension close to the top thereof.

9. The improvement set forth in claim 6, wherein
   each of said upward extensions has a top portion and two rising side portions and
   each of said openings is defined by edge portions disposed closely below said top portion and closely beside said side portions.

10. The improvement set forth in claim 6, wherein each of said openings consists of an outwardly open recess and extends into said upward extension and over a major part of the height of the respective side wall at said upward extension.

* * * * *